UNITED STATES PATENT OFFICE.

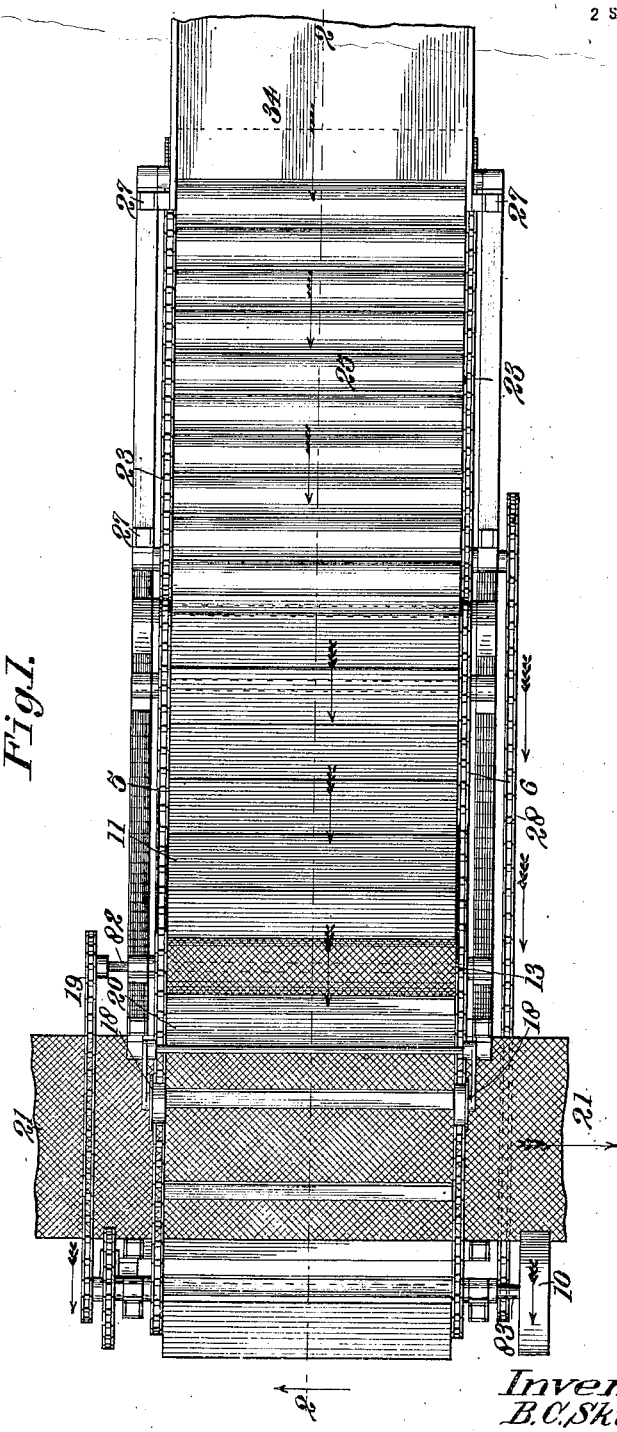

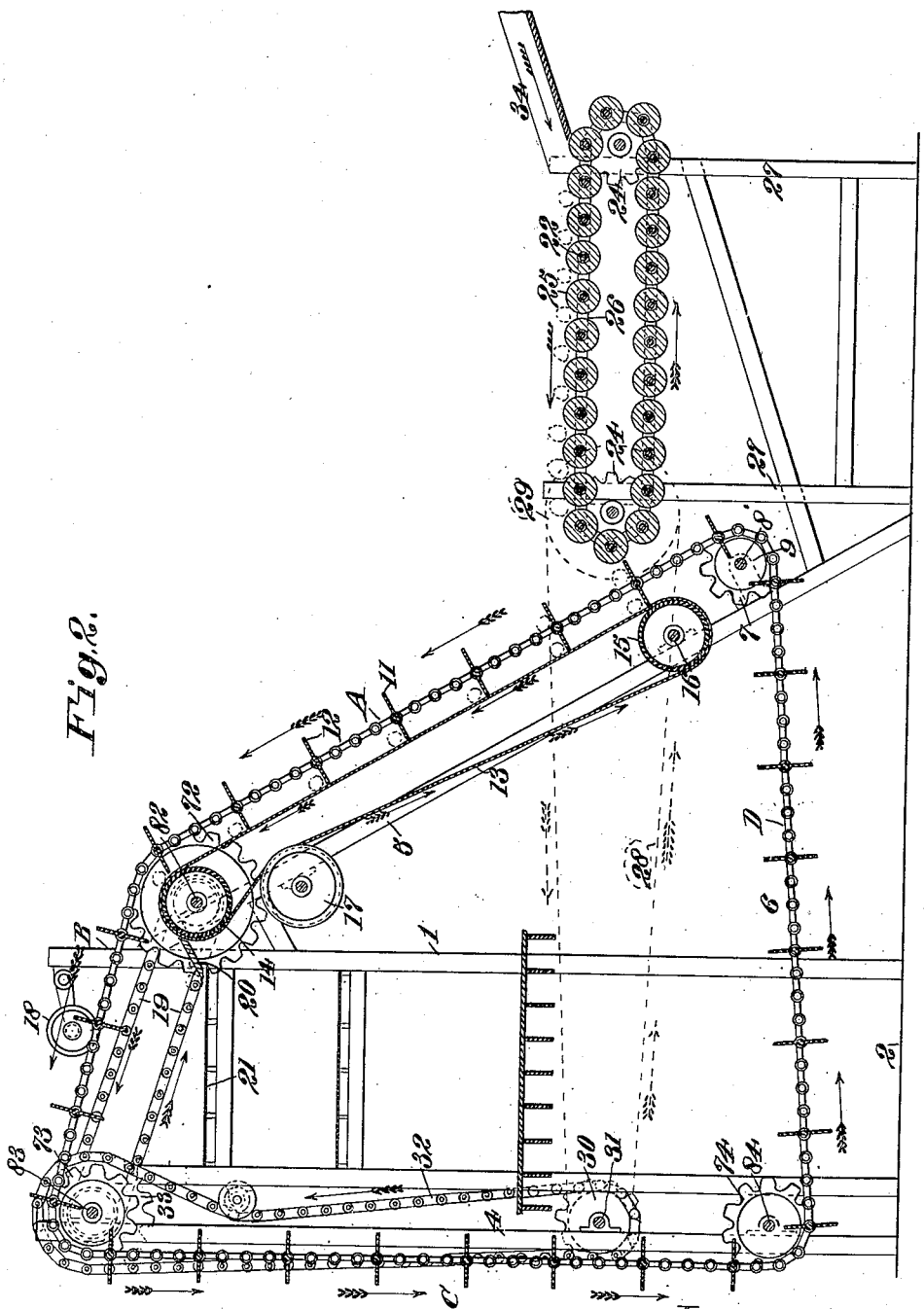

BRONSON C. SKINNER, OF DUNEDIN, FLORIDA, ASSIGNOR TO SKINNER MACHINERY COMPANY, OF DUNEDIN, FLORIDA, A CORPORATION OF FLORIDA.

ELEVATING APPARATUS.

1,413,138.            Specification of Letters Patent.     Patented Apr. 18, 1922.

Application filed November 5, 1920. Serial No. 421,810.

*To all whom it may concern:*

Be it known that I, BRONSON C. SKINNER, citizen of the United States, residing at Dunedin, in the county of Pinellas and State of Florida, have invented certain new and useful Improvements in Elevating Apparatus, of which the following is a specification.

The present invention relates to an elevating apparatus designed particularly for the handling or elevating of fruit such as oranges and the like, for elevating and conveying the same from one floor to another of a packing house.

The invention is of that conventional type commonly known as a bucket elevator, and has for its principal objects to provide a construction wherein the fruit during its elevation is delivered to the buckets in fixed charges thereby insuring the noncrowding of the buckets, and overcoming the loss of fruit due to spilling from the buckets should the same be in an overcrowded condition.

A further object is to provide an elevating structure wherein the fruit during its elevation is rotated, thus preventing injury to the surface thereof due to pinching.

The invention consists primarily in an inclined elevating flight consisting of two endless conveyors one within the other, the inner conveyor being of relatively solid construction and forming a back wall for the elevating flight. The outer conveyor consists of suitable plates movable upwardly with the back wall, but at a speed less than the movement of the back wall, the point of contact of the edges of the plates which are extended at substantially right angles outwardly from the back wall and transversely thereof providing material receiving pockets or buckets, and the accelerated movement of the back wall relatively to the plates preventing the pinching or jamming of the fruit therebetween. There is provided a pocketed feeding member for delivering fruit to be elevated on to the respective plates, each plate receiving the fruit from a predetermined number of pockets preventing the overcrowding of the plates and overcoming the damage of the fruit due to falling from the plates should the same be overcrowded.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein Figure 1 is a view in top plan of the preferred embodiment of my invention, and Figure 2 is a vertical sectional view taken on line 2—2 of Figure 1.

In the drawings, wherein like characters of reference designate corresponding parts, the numerals 1 indicate the upright or corner supporting posts preferably four in number, and which pass upwardly from a floor 2 to a point through and above the floor 3; this illustration representing an installation in a two story packing house where it is desired to elevate the fruit from one floor to another.

Parallel with certain of the posts 1 are other vertically disposed posts 4 and inclined upwardly to contact with certain of said posts 1 are the inclined flight supporting posts 5.

The elevator consists of a pair of endless flexible side chains 6 operating over sprockets 7, 72, 73 and 74 at opposite ends of the transversely disposed shafts 8', 82, 83 and 84 carried in suitable bearings 9 and their respective supporting posts. The sprockets and shafts are disposed to retain the endless chain 6 to provide an inclined front or elevating flight A therefor disposed substantially parallel with the inclined posts or supports 5, Figure 2 of the drawings, and with the said flight terminating in an upper substantially horizonal flight B between sprockets 72 and 73, and which flight connects with the vertical return flight C between sprockets 73 and 74, which flight C connects with the horizontal lower return flight D between sprockets 74 and 7. The shaft 83, hereinafter designated as the power shaft, carries on its end a power receiving wheel 10 adapted to be driven in the direction of the arrow, Figure 1 of the drawings, and to rotate with said shaft are fixed the sprockets 73. On the rotation of the shaft 83 in the direction of the arrow Figure 1, it will be apparent that simultaneous movement in a single direction is imparted to the respective chains 6, causing the same to travel in the direction of the arrows, Figure 2 of the drawings. At suitable points, said chains 6 are connected at spaced intervals by the transversely disposed elevating plates 11, the longitudinal side edges of which are adapted to project laterally beyond the opposite faces of the chain, as at 12, Figure 2 of the drawings.

Mounted to operate within the endless chain conveyor is a second conveyor consisting of an endless belt 13 of a width corresponding to the length of the plates 11, Figure 1 of the drawings, and the same operates over a suitable drum 14 keyed to rotate with the shaft 82 between the sprocket 72 and around a drum 15 rotatable with a shaft 16 mounted at the lower ends of the members 5 at a point above the shaft 8'. The diameter of the drum 14 and the drum 15 is such as to divide said belt 13 into two flights, with the outer flight disposed in a plane parallel with the plane A of the chains 6 but a slight distance inwardly therefrom, as in Figure 2 of the drawings, said outer flight of the belt 13 providing a back wall for the elevating conveyor and the outer surface of said belt flight adapted to contact with the inner edges 12 of said plates 11, providing at their juncture fruit receiving pockets, as indicated in Figure 2 of the drawings.

By disposing the plates 11 at right angles to the direction of travel of their attached and supporting chains 6, it will be observed that said plates when co-operating with the outer flight of the belt 13 extend in a slight upward inclination and are disposed at right angles outwardly from the outer face of said flight insuring the contacting of the fruit with the elevator back wall forming flight of the belt 13, as illustrated in Figure 2 of the drawings. During the elevation of the fruit to maintain the belt 13 taut about the drums 14 and 15, a suitable take up roll 17 is provided to operate against the rear flight thereof. To maintain the chains 6 tight and to take up slack, I provide the take up rolls 18, one co-operating with each chain, as illustrated in Figure 2.

Power is imparted to the belt 13 to drive the same in the direction of the arrows, Figure 2 of the drawings, through a chain 19 connected with the sprocket on the end of shaft 82, said chain being driven by a sprocket and shaft 83. The driving connection between shafts 83 and 82 through the chain 19 is such as to rotate the drum 14 at a speed to cause the belt 13 to travel at a slightly greater rate of speed than that of the chain 6, thus insuring the non-pinching of the fruit when the same is deposited on the upper surface of the plates 11 and falls by gravity into contact with the upwardly moving conveyor back wall formed by the belt 13.

In accomplishing this result, it will be understood that the sprockets 72 are loose on the shaft 82, which permits of a speed of rotation of the shaft 82 greater than the speed of rotation of the sprocket 72. Co-operating with the drum 14 at a point rearwardly of the shaft 82, is a suitably inclined conveying board 20 discharging on to the upper flight of an endless movable conveyor 21 supported between the posts 1 and adapted to convey the elevated fruit to any suitable place of deposit.

To provide for the feeding of material to the successive elevating plates in charges not greater than the capacity of said plates, I provide an endless roller feed belt 22 consisting of side chains 23 operating over sprockets 24 dividing the same into upper and lower flights, said chains being connected by the parallel spaced transversely disposed conveyor rolls 25.

By the employment of roll construction, I provide material receiving pockets 26 between consecutive rolls, which pockets are adapted for receiving in each a certain volume of material, which volume is not greater than the capacity of one of the plates 11. The sprockets 24 are carried by a frame 27 and the discharge end of the upper flight of said conveyor communicates with the lower end of the elevating flight formed by the chains 6 and outer surface of the belt 13 as illustrated in Figure 2 of the drawing. The conveyor 22 is operated in timed relation with the movement of elevating plates 11 to discharge the contents of successive pockets on to successive plates by a suitable chain 28 operating around the sprocket 29 carried by the shaft mounting one of said sprockets 24, and such chain being driven by a sprocket 30 on a shaft 31, which is in turn driven by a chain 32 operating around a sprocket 33 on the drive shaft 83. The material is fed to the feed conveyor 22 by any suitable mechanism such as the chute 34, Figure 2 of the drawings.

It will be apparent that by operating the material feed conveyor 22 to discharge the contents of successive pockets 26 on to the plates 11, as said plates successively move into co-operating relation with the discharge end of the upper flight of said conveyor that a quantity of fruit not greater than the maximum capacity of each plate is delivered successively to said plates, and, due to the inclination of the plates, rolls rearwardly thereof into contact with the elevating flight back wall formed by the outer surface of the belt 13. The rear wall of the elevating flight travelling at a greater speed than that of the plates 11, precludes the jamming or pinching of the fruit between the contacting edge of the respective plates with the surface of the belt, and tends to roll the fruit forwardly on its respective plates. As the plates successively pass over the sprockets 72, it will be observed that the same travel over the drum 14 for a portion of its circumference maintaining the fruit carried upwardly thereby on to the portion of the belt 13 as the same passes around the drum 14, and as said plates pass from said sprockets 72, it will be observed that the fruit will roll by gravity down the board 20 on to the conveyor 21.

I claim:—

1. An apparatus for the described purpose comprising an elevating conveyor consisting of two members movable in an upward inclined direction and one disposed within the other, one of said members providing a relatively unbroken conveyor back wall and the other member providing a plurality of spaced article elevating members disposed transversely across the outer face of said back wall member in co-operative relation therewith, means for moving said members in the same direction, and a pocketed conveyor communicating with said elevating conveyor and operated in timed relation therewith for discharging the contents of its pockets successively on to said transverse article elevating members.

2. An apparatus for the described purpose comprising an elevating conveyor consisting of two members movable in an upward inclined direction and one disposed within the other, one of said members providing a relatively unbroken conveyor back wall and the other member providing a plurality of spaced article elevating members disposed transversely across the outer face of said back wall member in co-operative relation, therewith, means for moving said members in the same direction, at relatively different speeds, and a pocketed conveyor communicating with said elevating conveyor and operated in timed relation therewith for discharging the contents of its pockets successively on to said transverse article elevating members.

3. An elevating apparatus for the described purpose comprising an elevating conveyor consisting of two members movable in an upward direction one within the other, one of said members consisting of an endless flexible belt providing a conveyor back wall, the other member consisting of spaced flexible members connected at spaced points by a plurality of article elevating members disposed transversely across the outer face of said back wall member, a drum around which said belt operates at its upper end and over which said flexible members and article elevating members pass, means for operating said conveyor forming members in the same direction, a pocketed feed conveyor discharging on to said elevating conveyor and operated in timed relation therewith for discharging the contents of its pockets successively on to said article elevating members, and means for receiving the elevated material from said back wall member as the same passes around said drum.

4. An apparatus for the described purpose comprising an elevating conveyor consisting of two upwardly inclined endless members one operating within the other and both movable in the same direction, the inner one of said members comprising an endless belt, a drum around which the upper end of said belt operates, the other of said members comprising a plurality of spaced elevating plates disposed to extend transversely across the outer face of said belt and when in co-operation therewith extending at substantially right angles outwardly from the outer face of said belt, endless means for connecting said plates, said means movable over the axis of rotation of said drum, an endless pocketed material feed conveyor discharging at one end on to said plates, means for moving said elevating conveyor means upwardly, means for receiving the elevated material from said belt as the same passes over said drum, and means for operating said feed conveyor to discharge the contents of successive pockets on to successive plates.

5. An apparatus for the described purpose comprising an elevating conveyor consisting of two endless travelling members one operating within the other and disposed with their operating flights in co-operative parallel upwardly inclined planes, the inner member comprising a flexible belt providing a back wall, a drum upon which said belt operates at the upper end of said flight, the other member comprising a pair of endless flexible members movable at the upper end of the operating flight transversely across the axis of rotation of said drum, parallel spaced elevating plates connected at opposite ends to said endless members and adapted to extend transversely across the outer face and projecting outwardly at substantially right angles from said back wall forming belt and when in co-operative relation therewith affording a material receiving pocket between the outer face of the belt and the inner edge of each plate, an endless pocketed material feed conveyor without the path of said elevating conveyor and discharging at one end on to said plates, means for operating said feed conveyor to discharge the contents of successive pockets on to successive plates, means for receiving the elevated material from said back wall as the plates move over said drum, and means for operating said elevating conveyor members in timed relation with said feed conveyor and with said back wall forming belt moving at a greater speed than said plates.

6. An apparatus for the described purpose comprising an elevating conveyor consisting of two endless travelling members one operating within the other and disposed with their operating flights in co-operative parallel upwardly inclined planes, the inner member comprising a flexible belt providing a back wall, a drum around which said belt operates at the upper end of said flight, the other member comprising a pair of endless flexible members movable at the upper end of the operating flight transversely across the axis of rotation of said drum, parallel spaced elevating plates connected at opposite ends to said endless members and adapted to extend transversely across the outer face and projecting outwardly at substantially right angles from said back wall forming belt and when in co-operative relation therewith affording a material receiving pocket between the outer face of the belt and the inner edge of each plate, an endless pocketed material feed conveyor without the path of said elevating conveyor and discharging at one end on to said plates, means for operating said elevating conveyor members at relatively different speeds, and means for operating said feed conveyor member in timed relation with said outer elevating conveyor forming member to discharge the contents of successive pockets on to successive plates on the movement of said pockets and plates into co-operative relation.

7. A fruit elevator consisting of a conveyor having an inclined flight, an endless travelling back wall for said flight, a plurality of elevating plates extending transversely of said back wall and projecting outwardly therefrom, flexible members connecting the opposite ends of said plates and adapted to pass over the upper line of said back wall and to carry said plates thereover, means for operating said conveyor forming members in an upward direction, means for delivering material to be elevated to the upper surface of said plates at a point adjacent the lower end of said elevating flight, and means for receiving the material when elevated to the top of the said back wall.

8. A fruit elevator consisting of an endless upwardly inclined belt, a pair of drums about which said belt operates, said drums dividing the same into forward and rear flights, a pair of chains disposed parallel with the front face of the belt adjacent its opposite side edges, sprockets adjacent said drums and around which said chains pass, a plurality of relatively flat plates disposed transversely of said front belt flight with their inner edges substantially in contact therewith and disposed with their upper surface lying in a plane substantially at right angles to the outer face of said front flight, said plates connected at their opposite ends to said chains, means for moving said chains and front belt flight in an upward direction, and means disposed adjacent the drum driven and operated in timed relation with the movement of said chains for depositing successive charges of material on to said plates as successively received in register therewith.

9. A fruit elevator consisting of a conveyor having an inclined flight, an endless movable back wall for said flight, a plurality of elevating plates extending transversely of said back wall and projecting outwardly therefrom, flexible members connecting the opposite ends of said plates and adapted to pass over the upper line of said back wall and to carry said plates thereover, means for operating said conveyor forming members in an upward direction, an endless pocketed material feed conveyor without the path of said elevating conveyor and communicating at one end therewith, and means for operating said feed conveyor member in timed relation with said flight to discharge the contents of successive pockets on to successive plates on the movement of said pockets and plates into co-operative relation.

10. A fruit elevator consisting of a conveyor having an inclined flight, an endless movable back wall for said flight, a plurality of elevating plates extending transversely of said back wall and projecting outwardly therefrom, flexible members connecting the opposite ends of said plates and adapted to pass over the upper line of said back wall and to carry said plates thereover, means for operating said conveyor forming members in an upward direction, an endless material feed conveyor communicating at one end with said elevating conveyor and consisting of a plurality of parallel conveyor rollers, means interconnecting said rollers at adjacent ends providing material feed pockets between the rollers, and means for operating said feed conveyor member in timed relation with said flight to discharge the material held between adjacent rollers on to successive plates on the movement of said plates and pockets into co-operative relation.

11. An elevator consisting of an inclined flight, an endless travelling back wall for said flight, a plurality of material elevating members extending transversely of said back wall and each providing therewith a material receiving and elevating pocket, flexible members connecting said plates and adapted to pass over the upper line of said back wall and to carry said plates thereover, a material feed conveyor disposed angularly to said elevator for feeding successive charges of material on to successive plates, and a driving connection between said inclined flight and said feed conveyor for operating said conveyor in timed relation with said inclined flight.

12. An apparatus for the described purpose comprising an elevating conveyor consisting of two members upwardly inclined and one disposed within the other, one of said members providing a relatively unbroken endless movable conveyor back wall and the other member providing a plurality of spaced article elevating members disposed transversely across the outer face of said movable back wall member in co-operative relation therewith, means for moving said article elevating members in unison, a pocketed conveyor communicating with said elevating conveyor and operated in timed relation therewith for discharging the contents of its pockets successively on to said transverse article elevating members, and a driving connection between said latter members of the elevating conveyor and said pocketed conveyor for operating the same in timed relation.

13. A fruit elevator consisting of a conveyor having an inclined flight, an endless movable back wall for said flight, a plurality of elevating plates extending transversely of said back wall and projecting outwardly therefrom, flexible members connecting the opposite ends of said plates and adapted to pass over the upper line of said back wall and to carry said plates thereover, means for operating said conveyor forming members in an upward direction, a feed conveyor for delivering a charge of material to be elevated to the upper surface of successive plates at a point adjacent the lower end of said elevating flight, means for receiving the elevated material from said plates on their movement over said back wall, and a driving connection between said conveyor flight and feed conveyor for operating the same in relatively timed relation.

In testimony whereof I have signed my name to this specification.

BRONSON C. SKINNER.